2,193,724

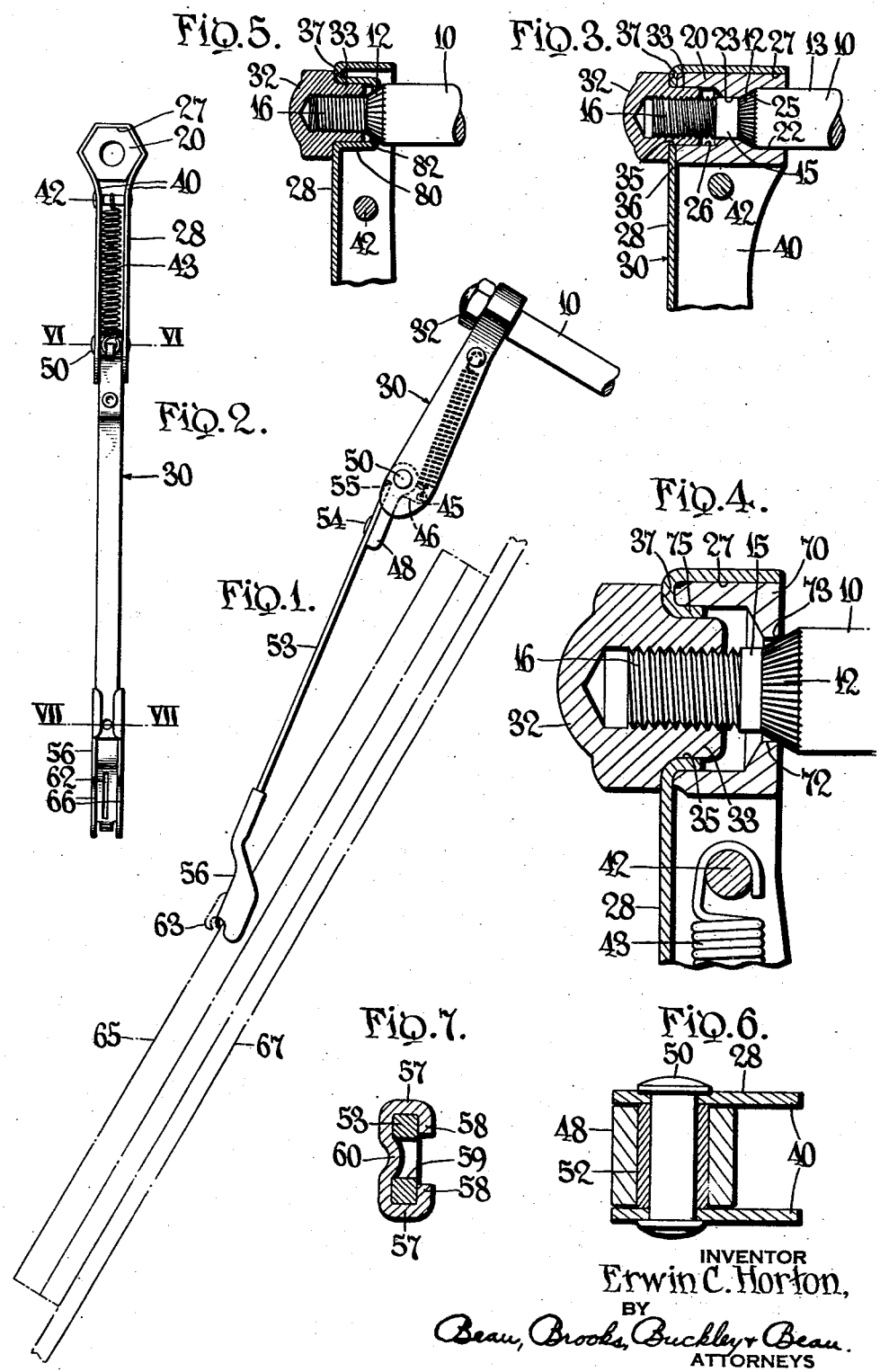
March 12, 1940. E. C. HORTON 2,193,724
WINDSHIELD CLEANER STRUCTURE
Filed April 24, 1936
INVENTOR
Erwin C. Horton,
BY
Beau, Brooks, Buckley & Beau.
ATTORNEYS Patented Mar. 12, 1940

UNITED STATES PATENT OFFICE 2,193,724

WINDSHIELD CLEANER STRUCTURE

Erwin C. Horton, Hamburg, N. Y., assignor to Trico Products Corporation, Buffalo, N. Y.

Application April 24, 1936, Serial No. 76,186
In Great Britain February 29, 1936

10 Claims. (Cl. 287—52.02)

This invention relates to window wipers or cleaners and it has particular relation to the type of structure wherein an oscillatable wiper actuating arm is connected to and driven by a shaft of a suitable motor, such as the so-called suction motor, electric motor, or other power.

One of the principal features of the invention is exemplified in the connection between the wiper arm and the motor shaft including an improved arm construction which facilitates its mounting and whereby a rigid driving connection is provided while, at the same time, angular adjustment between the arm and motor shaft can be made.

An aperture is provided in the wiper arm for receiving the end of the motor shaft which is formed with a portion adapted to be impressed upon, or even to bite into, the wall or rim of the aperture to provide a rigid driving connection.

In providing a connection of this kind a portion of the motor shaft is formed into substantially cone shape, the surface of which is upset by milling, knurling, serrating, or the like, and the apertured portion of the wiper is clamped axially against the conical surface to form the rigid connection. The clamping can be of such degree as to insure biting of the upset surface elements into the engaging portion of the arm.

In further adaptation of the invention the wiper arm can be formed in sections, the upper section of which is in channel form and has an upper irregular or non-circular socket which receives a sleeve or clamping collar therein against relative rotation. This sleeve constitutes the portion of the wiper arm that directly engages the knurled conical surface, or in other forms of the invention, the channel can be so formed as to contact directly the conical surface and, thus avoid the use of the sleeve. A nut is screwed upon the end of the shaft against the end portion of the wiper to secure the wiper in clamped relation against the conical surface.

The lower section of the wiper arm is pivoted to the lower end portion of the channel section and has an angular extension connected to a spring which is in turn connected in the channel adjacent its upper end. The spring is maintained normally under tension for the purpose of pivoting the lower section of the arm toward a glass surface to be cleaned. The connection of the lower end of the section with a wiper blade is achieved in a conventional manner. However, an adapting head or clip for receiving the wiper blade is channeled, and formed or folded about the body of the lower section in such manner as to provide for pressing a bead from the clip body into a recess in the body of the section for purpose of rigidly assembling these elements.

One of the principal objects of the invention is to provide an improved windsheld wiper structure embodying the features referred to above.

In the drawing:

Fig. 1 is a side elevation of a wiper arm for windshield cleaners as applied to a cleaner blade and motor driven shaft;

Fig. 2 is a rear elevation of the wiper arm;

Fig. 3 is a vertical section, on a larger scale, and illustrating the elements for mounting the wiper arm upon the motor driven shaft;

Fig. 4 is a vertical section, on a larger scale, similar to Fig. 3 and illustrating another arrangement of assembling elements for the wiper arm and shaft;

Fig. 5 is a vertical section similar to Fig. 4 and illustrating still another arrangement of assembling elements for the wiper arm and shaft;

Fig. 6 is a cross section, on a larger scale, taken substantially along the line VI—VI of Fig. 2; and Fig. 7 is a cross section, on a larger scale, taken substantially along the line VII—VII of Fig. 2.

Referring to Figs. 1, 2 and 3 a driven oscillatable shaft 10 of a windshield cleaner motor (not shown) is provided with an intermediate serrated or grooved surface or section 12 which integrally joins a larger cylindrical portion 13 of the shaft to a smaller cylindrical section 15 of the shaft toward the end thereof, and the end portion of the shaft beyond the smaller cylindrical section is formed with screwthreads 16.

An assembling and clamping sleeve or collar 20 which is mounted axially upon the end portion of the shaft, is provided with inner cylindrical surfaces 22 and 23 fitting snugly about the cylindrical surfaces 13 and 15, respectively, of the shaft, and is also provided with an inner conical surface 25 substantially the same shape as the conical section 12. The conical surfaces 12 and 25 are normally fitted against each other in wedging relation. An inner cylindrical surface 26 adjacent the outer end of the sleeve 20 is spaced radially from the threaded end portion of the shaft.

The outer peripheral surface of the sleeve 20 is polygonal or non-circular (Fig. 2) and fits snugly into a similarly shaped socket 27 of a spring retaining channel 28 composed of sheet metal and forming a part of a sectional windshield wiper arm 30. It is to be understood that the channel 28 can be stamped from a flat sheet of metal into the forms shown in the drawing.

By this construction it will be noted that the wiper arm body may be generally made of light stock with the clamping sleeve or collar formed from a relatively harder or stronger metal since the clamping pressure from the nut is transmitted directly through the bottom wall of the socket and the collar without any pressure being carried by the side wall of the socket.

A nut 32 threaded upon the end of the shaft is provided with a sleeve or skirt 33 which telescopes into the outer end of the sleeve and its outer surface substantially contacts the inner cylindrical surface 26 adjacent the outer end of the sleeve 20. This nut extends through an opening 35 formed in the front wall or web 36 of the channel member at the socket 27, and the opening 35 corresponds in diameter substantially to the diameter of the outer surface of the nut skirt 33 so as to insure a snug engagement therein. A shoulder 37 formed at the inner side of the nut head and joining the nut skirt thereto impinges against the outer surface of the socket and when the nut is screwed upon the end of the shaft the sheet metal stamping forming the spring retainer 28 and thrust receiving collar 20 are clamped tightly between the nut and the conical section 12 of the shaft. The grooved or serrated nature of the conical section 12 prevents relative rotation of the sleeve and shaft, and since the socket 27 is polygonal in its interfitting relation upon the polygonal surface of the sleeve 20, the spring retainer is firmly fixed upon the shaft. The conical configuration of the section 12 also automatically insures proper angular relation between the shaft and channel member 28 upon tightening the nut 32.

Opposite rearwardly extending flanges 40 of the channel member 28 adjacent the upper end of the latter are provided with a transverse pin 42 rigidly secured therein and receiving one end of a coiled tension spring 43 which is hooked or otherwise fastened thereon. The other end of the spring is fastened in an eye 45 (Fig. 1) formed in the outer end portion of an arm 46 which extends substantially at right angles from a hinge member 48 forming a part of the wiper arm 30. A pin or rivet 50 which extends through the side flanges 40 adjacent the outer or lower end of the channel member is provided with a bearing bushing 52 having its opposite ends abutting the opposed inner walls of the flanges 40. The bushing serves as a spacer to prevent the channel sides 40 from being bent inwardly and it rotatably supports the hinge member 48 thereon. One end of a strip or bar 53 of resilient metal is riveted, as indicated at 54, to the hinge member 48 and extends normally outwardly and longitudinally of the channel member 28. The inner or upper end of the strip abuts a shoulder 55 formed by cutting away a portion of the hinge member 48 and, upon riveting the strip thereon, the shoulder cooperates in preventing pivotal movement or displacement of the strip with respect to the hinge member 48.

The outer end of the strip 53 is provided with a clip 56 of channel form and having side flanges 57 embracing the edges of the strip. Angular flange extensions 58 overlap the inner or rear side of the strip 53. An opening 59 is formed in the end portion of the strip and, in clamping or stamping the flanges 57—58 around this strip end, a portion of the sheet metal of the clip 56 is stamped or pressed into the opening 59, as indicated at 60, and for purposes of securing a non-sliding rigid connection.

The outer end portion of the clip 56 is provided with an opening or slot 62 for engagement with a fastening element 63 of a wiper blade 65, and side flanges 66 of the clip adjacent the fastener extend partially down the sides of the blade.

It will be observed that the spring 43 is normally under tension and tends to pivot the hinge 48, together with its strip 53, rearwardly; that is, the spring exerts a cranking action upon the arm 46 about the pivot pin 50 of the hinge member and thus, the wiper blade 65 is pressed firmly against a windshield 67 during the operations of cleaning the latter.

In the form of structure shown in Fig. 4, the motor driven oscillatable shaft 10 is formed in the same manner as the shaft bearing the same reference character in Fig. 3. However, in this arrangement a sleeve or cup 70 is mounted on the end portion of the shaft and has an axial opening 72 therein defining an outer circumferential corner 73 that engages the grooved or serrated section 12. The same kind of channel member 28 as that previously described is employed in this construction with the exception that the opening 35 is defined by pressing or stamping an inwardly turned annular flange 75 for firmly anchoring therein the outer marginal portion of the cup 70. The outer periphey of the cup is polygonal or non-circular, like the sleeve 20, for accommodating the like polygonal shape of the upper socket portion of the channel member. The nut 32 is secured upon the screw threaded end of the shaft which, in all cases, is smaller than the other portions of the shaft, and the shoulder 37 impinges upon the adjacent portion of the channel member 28. The skirt 33 of the nut fits into the annular flange 75 in the same manner as the corresponding skirt shown in Fig. 3 fits into the end of the sleeve 20. The remaining portions of the wiper arm are constructed in the same manner as that shown in Figs. 1 and 2.

In the arrangement shown in Fig. 5, the channel member 28 has its upper end formed to take the place of members, such as the sleeve 20 and cup 70, and to this end, the front wall of the channel member is stamped or otherwise formed with an integral thrust receiving collar in the form of a rearwardly extending annular flange 80 into which the skirt 33 of the nut fits and the inner extremity of the flange is turned transversely or at right angles to the axis of the motor driven shaft to form a radial flange 82. In screwing the nut 32 upon the end of the shaft the inner end of the nut skirt 33 bears against the flange 82 and wedges the latter tightly against the grooved or serrated section 12 of the shaft to provide a rigid assembly in which the wiper arm is angularly adjustable.

From the foregoing description it will be apparent that the wiper arm is provided with a very effective connection to the motor shaft and, at the same time, angular adjustment of the arm is possible in order to insure disposition of the elements in their proper relative positions to afford the maximum operating efficiency.

Although more than one form of the invention has been shown and described in detail, it will be apparent to those skilled in the art that the invention is not limited to these disclosures, but that various changes can be made therein without departing from the spirit of the invention or from the scope of the invention defined in the appended claims.

I claim:

1. A windshield cleaner structure comprising a drive shaft, a wiper arm having a socket in its end portion and having the shaft extending through the socket, a thrust receiving collar interlocking with the side walls of said socket and seating against the bottom wall thereof, said shaft having a shoulder against which the collar seats, and means acting on the bottom wall of the socket for forcing the collar axially of the shaft into locking engagement with said shoulder to interlock the arm and shaft.

2. A windshield cleaner structure comprising a shaft, a wiper arm having a sheet metal socket in its end portion, the shaft being provided with a shoulder, the base of the socket being formed by a wall extending transversely of the shaft, said wall being provided with an opening the edge of which is spaced from the shaft, a thrust receiving part extending from the wall into direct engagement with the shoulder on the shaft for directly transmitting the thrust from a clamping nut to the shoulder, and a clamping nut engaged with the shaft within the opening of said wall and having a part overhanging the wall to press the same toward the shoulder.

3. A wiper arm for windshield cleaners in which the driving shaft is provided with a shoulder, said arm having a socket formed with a side wall and a transverse wall, the transverse wall being provided with an opening to give access to the end portion of the shaft adjacent the shoulder, a thrust receiving collar within the socket for supporting the transverse wall off the shoulder, and clamping means engageable with the end of the shaft and with the transverse wall about the opening to force the collar firmly and interlockingly against the shoulder independently of the side wall of the socket, and clamping means serving to clamp the transverse wall against the collar.

4. A wiper arm for windshield cleaners in which the driving shaft is provided with a shoulder, said arm having a sheet metal socket formed with a side wall and a transverse wall, the transverse wall being provided with an opening to give access to the end portion of the shaft adjacent the shoulder, a thrust receiving collar within the socket for supporting the transverse wall off the shoulder, and clamping means engageable with the end of the shaft and with the transverse wall about the openings, and acting through said transverse wall to force the collar firmly and interlockingly against the shoulder independently of the side wall of the socket, said collar being spaced from the end of the shaft and said clamping means being provided with an axial extension for being received by the collar in supporting relation therewith.

5. A windshield cleaner structure comprising a shaft, a wiper arm having a socket in its end portion, the shaft being provided with a shoulder, the base of the socket being formed by a wall extending transversely of the shaft, said wall being provided with an opening the edge of which is spaced from the shaft, a thrust receiving member extending from the wall into direct engagement with the shoulder on the shaft for directly transmitting the thrust from a clamping nut to the shoulder, and a clamping nut engaged with the shaft, said nut having an arm supporting part extending into the space between the edge of the opening and the shaft in supporting relation to the arm and a second part overhanging the wall to act thereon in pressing the thrust receiving member into engagement with said shoulder.

6. A wiper arm for windshield cleaners, comprising a section formed with a socket providing a front wall in which there is a shaft receiving opening and an inturned wall portion about the opening, and a relatively heavier shaft engaging washer dished to receive the inturned wall portion to reinforce the same and said front wall and adapted to engage a shoulder on the actuating shaft to be pressed into interlocking engagement therewith.

7. A wiper arm for windshield cleaners, comprising a section having a hollow shaft receiving portion opening through the front wall thereof, and a shaft engaging thrust receiving ring interlockingly received by and within the hollow portion and having its inner peripheral margin shaped to interlockingly engage a shoulder on the actuating shaft whereby the ring serves to key the section to the shaft.

8. A windshield cleaner structure comprising a shaft, a wiper arm having a socket in its end portion, the shaft being provided with a shoulder, the base of the socket being formed by a wall extending transversely of the shaft, said wall being provided with an opening the edge of which is spaced from the shaft, a thrust receiving member integral with and extending from the wall into direct engagement with the shoulder on the shaft for directly transmitting the thrust from a clamping nut to the shoulder, and a clamping nut engaged with the shaft, said nut having an arm supporting part extending into the space between the edge of the opening and the shaft in supporting relation to the arm and a second part overhanging the wall to act thereon in pressing the thrust receiving member into engagement with said shoulder.

9. A windshield wiper arm having a socket to receive the actuating shaft of a cleaner motor, the bottom of the socket constituting a portion of the front wall of the wiper arm and formed with an opening through which the shaft protrudes, the shaft being provided with a shoulder, a thrust receiving collar within the socket seating on the bottom thereof and embraced laterally by the side walls thereof in a manner to secure the same against rotation in the socket, said collar having an opening of less diameter than the bottom opening for having its wall interlocking with the shoulder and serving to space the bottom wall about the shaft, and means engageable with the shaft and with the exterior surface of the bottom of the socket to act through the bottom for pressing the collar into interlocking relation with the shoulder.

10. A windshield cleaner structure comprising a drive shaft, a wiper arm having a socket in its end portion and having the shaft extending through the socket, a thrust receiving collar interlocking with the side walls of said socket and seating against the bottom wall thereof, said shaft having a shoulder against which the collar seats, said wiper arm having a portion adjacent the socket of the channeled cross section with the side walls of the channel merging into the side walls of the socket, means rigidly connecting the channel walls together at a point adjacent the socket to secure the interlocking embrace of the socket walls about the collar, and means acting on the bottom wall of the socket for forcing the collar axially of the shaft into locking engagement with said shoulder to interlock the arm and shaft.

ERWIN C. HORTON.

CERTIFICATE OF CORRECTION.

Patent No. 2,193,724. March 12, 1940.

ERWIN C. HORTON.

It is hereby certified that error appears in the printed specification of the above numbered patent requiring correction as follows: Page 3, first column, line 37, claim 3, for "and" read said; line 50, claim 4, for the word and comma "openings," read opening; and that the said Letters Patent should be read with this correction therein that the same may conform to the record of the case in the Patent Office.

Signed and sealed this 9th day of April, A. D. 1940.

(Seal)

Henry Van Arsdale,
Acting Commissioner of Patents.